(12) United States Patent
Pruitt

(10) Patent No.: US 12,715,621 B1
(45) Date of Patent: Aug. 25, 2026

(54) ACTIVE GAS-EXUDING HEAT SHIELD FOR SPACECRAFT ATMOSPHERIC ENTRY AND REENTRY

(71) Applicant: Mark Alkire Pruitt, Casper, WY (US)

(72) Inventor: Mark Alkire Pruitt, Casper, WY (US)

( * ) Notice: Subject to any disclaimer, the term of this patent is extended or adjusted under 35 U.S.C. 154(b) by 0 days.

(21) Appl. No.: 19/260,725

(22) Filed: Jul. 7, 2025

(51) Int. Cl.
*B64G 1/58* (2006.01)
*B64G 1/62* (2006.01)

(52) U.S. Cl.
CPC ................. *B64G 1/58* (2013.01); *B64G 1/62* (2013.01)

(58) Field of Classification Search
CPC .... B64G 1/58; B64G 1/62; B64C 1/38; B64C 3/36
See application file for complete search history.

(56) References Cited

U.S. PATENT DOCUMENTS 2,468,820 A * 5/1949 Goddard ................ F42B 15/34 60/915
3,319,887 A 5/1967 Gallagher
3,321,154 A 5/1967 Downs
3,410,502 A * 11/1968 Leadon .................... B64G 1/58 244/164
4,193,338 A 3/1980 Smiltnieks et al.
4,991,797 A * 2/1991 Miller ....................... B64C 1/38 165/41
5,351,917 A * 10/1994 Bulman ................... B64G 1/58 244/159.1
6,302,642 B1 10/2001 Nagler et al.
6,606,851 B1 8/2003 Herdy, Jr. et al.
7,237,752 B1 7/2007 Meyer
7,270,302 B1 9/2007 Wong et al.
11,312,208 B2 4/2022 Sun et al.
2021/0147060 A1* 5/2021 Sommerer ................ B64C 1/38
2023/0166872 A1* 6/2023 Keune .................... B64G 1/402 244/159.1

FOREIGN PATENT DOCUMENTS

CA 2690705 A 12/2008
WO 2012084396 A1 6/2012
WO 2021112934 A1 6/2021
WO 2022237965 A1 11/2022

OTHER PUBLICATIONS

Technique for Configuring an Actively Cooled Thermal Shield in a Flight System, Goddard Space Flight Center, Greenbelt, Maryland.

* cited by examiner

*Primary Examiner* — Joshua J Michener
*Assistant Examiner* — Colin Zohoori
(74) *Attorney, Agent, or Firm* — Whiteford, Taylor & Preston, LLP; Jeffrey Schell

(57) ABSTRACT

An active thermal protection system for spacecraft during atmospheric entry or reentry includes a working gas containment tank, a master control valve, distribution manifolds, gas dispenser units positioned on the spacecraft exterior surface, and a shield control unit. The system exudes a working gas through the gas dispenser units to create a protective gas envelope around critical spacecraft surfaces during high-heating phases of atmospheric entry. This gas layer insulates the spacecraft from direct contact with superheated atmospheric gases, carries away heat, and deflects high-temperature plasma. By actively controlling gas flow through a hierarchical control system, thermal protection can be dynamically adjusted in response to changing conditions, substantially enhancing reusability while maintaining effective thermal protection.

20 Claims, 11 Drawing Sheets

ACTIVE GAS-EXUDING HEAT SHIELD FOR SPACECRAFT ATMOSPHERIC ENTRY AND REENTRY

FIELD OF THE INVENTION

The present invention relates generally to thermal protection systems for spacecraft, and more specifically to an active thermal protection system that protects spacecraft during atmospheric entry or reentry by actively dispersing heated atmospheric gases that would otherwise cause catastrophic damage to the spacecraft.

BACKGROUND OF THE INVENTION

When spacecraft reenter Earth's atmosphere or the atmosphere of another planetary body, they encounter extreme aerodynamic heating due to the conversion of kinetic energy to thermal energy. This intense heating can reach temperatures exceeding 1,500° C. (2,700° F.), which far surpasses the thermal limits of conventional spacecraft structural materials. Without adequate thermal protection, a spacecraft would experience catastrophic failure during reentry. The severity of this heating challenge has necessitated the development of specialized Thermal Protection Systems (TPS) to shield spacecraft and their occupants during the reentry phase. These systems have historically constituted a significant portion of spacecraft mass and have presented numerous engineering challenges related to reliability, reusability, and maintenance.

Current thermal protection approaches generally fall into two main categories: ablative systems and non-ablative reusable systems. Ablative heat shields, like those used on Apollo capsules and many current spacecraft, function by intentionally sacrificing material through controlled burning and charring. This process carries heat away from the spacecraft through mass loss and phase change. While effective for single-mission vehicles, ablative systems present several significant drawbacks. They are inherently single-use, requiring complete replacement after each mission. They contribute substantially to vehicle mass, reducing payload capacity—for example, the Apollo heat shield alone weighed roughly 3,000 pounds, whereas the active heat shield alternative disclosed herein, using modern-day fabrication techniques and materials, is estimated to weigh less than 25% of that mass. They provide limited design flexibility for complex vehicle geometries. And they offer no capability for active thermal management during varied reentry profiles.

Reusable thermal protection systems, such as those employed on the Space Shuttle, typically use ceramic tiles or similar materials designed to withstand high temperatures without significant degradation. While theoretically reusable, these systems have demonstrated critical limitations. They are exceptionally fragile and prone to damage during handling, launch, and space operations. They require extensive, labor-intensive inspection and repair between flights. They present complex construction and attachment challenges, as tiles must be individually sized, shaped, and bonded to the spacecraft structure. And they have historically shown high maintenance requirements and limited durability across multiple missions. Even the more recent tile-based thermal protection systems used on vehicles like SpaceX's Starship have continued to demonstrate vulnerability to damage and maintenance challenges in early testing phases.

Particularly problematic areas for current thermal protection approaches include hard edges and leading surfaces, where airflow direction changes create concentrated heating zones. These areas experience the most intense thermal loads and are typically where material erosion or damage first occurs. At these locations, even advanced carbon composite materials can experience significant erosion due to the extreme heat flux. System reusability remains elusive despite decades of advancement; truly reusable thermal protection that can withstand multiple reentry cycles without significant repair or replacement continues to increase operational costs and turnaround time for reusable spacecraft. Integration complexity adds weight, cost, and failure points due to the complex integration required with the underlying spacecraft structure and thermal expansion mismatches between protection materials and the spacecraft structure. Additionally, operational flexibility is limited as most existing thermal protection systems are passive and cannot adapt to different reentry profiles or unexpected heating conditions during flight.

Despite significant advances in materials science and aerospace engineering, the fundamental approaches to thermal protection have remained largely unchanged since the early days of spaceflight. The limitations of current systems present a critical barrier to the development of truly reusable, cost-effective spacecraft that can operate routinely between Earth and space. There remains a pressing need for thermal protection solutions that overcome these limitations-systems that can withstand multiple reentry cycles with minimal maintenance, protect spacecraft structures reliably across varied mission profiles, and reduce the operational costs associated with spacecraft turnaround. Such innovation would represent a significant advancement in enabling more accessible and sustainable space transportation.

SUMMARY OF THE INVENTION

An exemplary embodiment of the present invention provides an active thermal protection system for spacecraft during atmospheric entry or reentry. The system actively protects the spacecraft by exuding a gas from surfaces prone to high heating, creating a protective gas envelope that insulates these surfaces and deflects high-temperature atmospheric gases that would otherwise cause catastrophic damage.

In a preferred embodiment, the active thermal protection system comprises a working gas containment tank, a master control valve (MCV), a plurality of distribution manifolds (DMs), gas header and distribution piping, a plurality of gas dispenser units (GDUs) mounted on the spacecraft's exterior surface, and a shield control unit (SCU) which communicates and receives commands from the flight control system (FCS), with the components interconnected by command and signal lines.

The working gas, preferably helium due to its favorable thermal properties and extremely low boiling point, is stored in the containment tank and released through the MCV during atmospheric entry. The gas flows through the distribution system to the GDUs, which are specially designed to exude the gas in patterns that maximize thermal protection based on their specific location on the spacecraft. Some GDUs direct gas perpendicular to the spacecraft hull, while others direct it parallel to the surface, creating an effective boundary layer that shields the spacecraft structure.

The system is managed through a hierarchical control architecture. The SCU monitors temperature sensors distributed across the spacecraft surface and commands the DMs to adjust gas flow rates to maintain hull temperatures within safe operating limits. The SCU interfaces with the spacecraft's FCS, enabling coordinated activation and deactivation of the thermal protection system at appropriate points in the flight trajectory.

The active gas-exuding heat shield system can be implemented in several configurations depending on spacecraft size and mission requirements. These range from minimal systems suitable for smaller vehicles to large systems with distributed control modules for complex spacecraft geometries. In all configurations, the fundamental principle remains the same: active, controlled exudation of gas to create a protective thermal barrier during the critical phases of atmospheric entry.

Unlike traditional passive thermal protection systems that rely either on ablative materials that burn away or fragile heat-resistant tiles that require extensive maintenance between flights, the present invention provides a renewable, actively controlled solution that substantially enhances reusability while maintaining effective thermal protection.

The active thermal protection system functions by creating a gas layer that serves multiple purposes: it insulates the spacecraft surface from direct contact with superheated atmospheric gases, carries away heat that would otherwise transfer to the spacecraft structure, and deflects high-temperature plasma and ionized gases that form during hypersonic flight through the atmosphere. By actively controlling the flow of this protective gas layer, the invention can adjust thermal protection dynamically in response to changing conditions during the entry trajectory.

DETAILED DESCRIPTION

The present invention relates to an active thermal protection system for spacecraft during atmospheric entry or reentry, specifically an active gas-exuding heat shield that protects the spacecraft from the extreme aerodynamic heating experienced during descent through a planetary atmosphere. Unlike traditional passive thermal protection systems that rely either on ablative materials that burn away or fragile heat-resistant tiles that require extensive maintenance between flights, the present invention provides a renewable, actively controlled solution that substantially enhances reusability while maintaining effective thermal protection.

Figure 1:
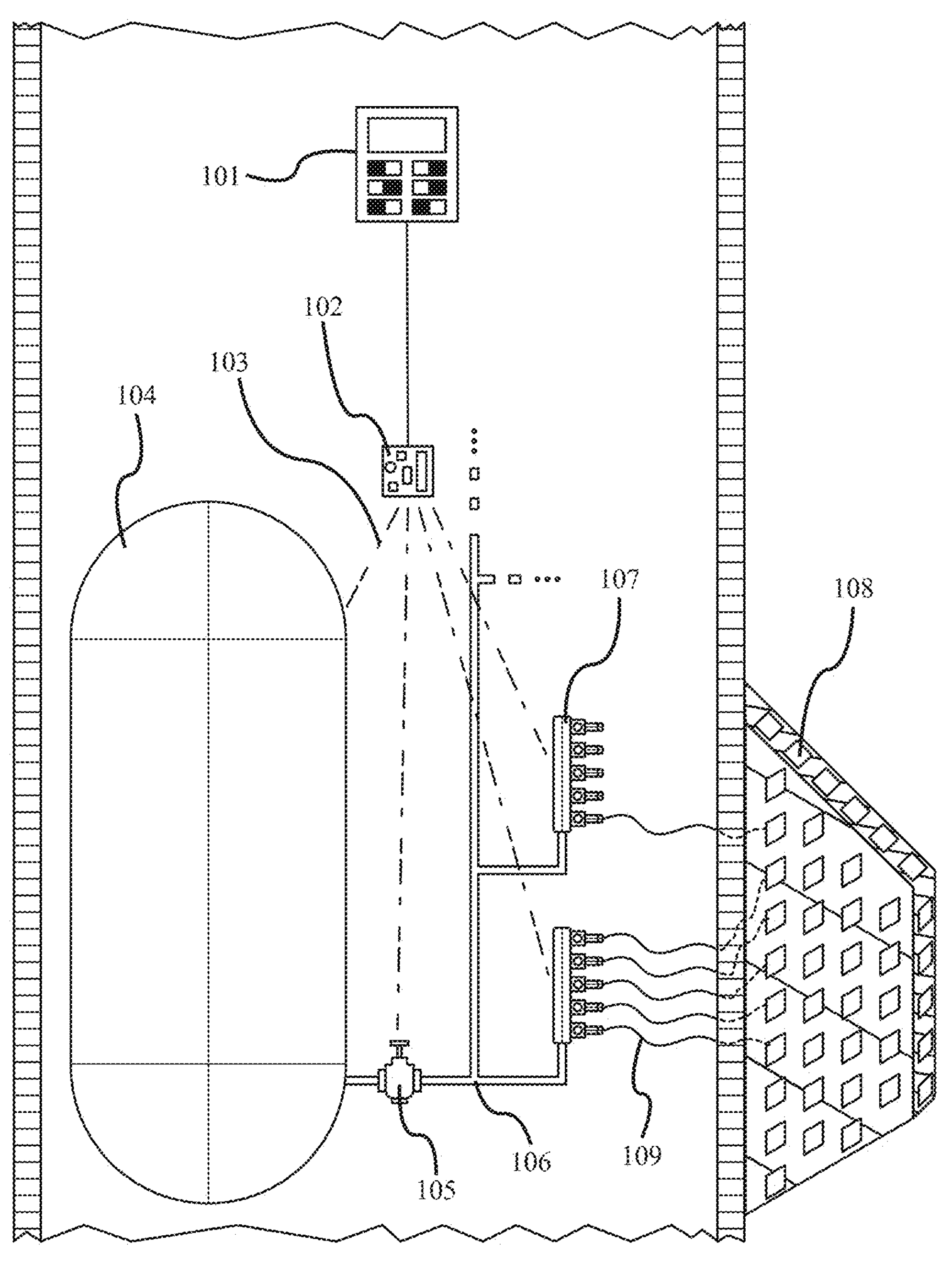
FIG. 1 is a schematic diagram showing the basic components of the active thermal protection system in accordance with an embodiment, including the flight control system, shield control unit, command and signal lines, working gas containment tank, master control valve, gas header and distribution piping, distribution manifolds, gas dispenser units, and distribution piping.

FIG. 1 depicts a schematic diagram illustrating the basic components of the active thermal protection system in a representative configuration. The flight control system (101) represents the spacecraft's primary avionics system that interfaces with and coordinates the operation of the thermal protection system. The shield control unit (102) serves as the dedicated electronic controller for the active heat shield system, monitoring system status and processing temperature sensor data to command gas flow adjustments. Command and signal lines (103) provide the communication pathways between system components, employing radiation-hardened electrical or optical connections to transmit control commands and feedback data. The working gas containment tank (104) functions as the primary pressurized reservoir storing the working gas, preferably helium, constructed of lightweight, high-strength materials capable of withstanding operational pressures. The master control valve (105) acts as the primary on/off control for the entire system, regulating initial gas release from the containment tank with redundant actuation mechanisms for operational reliability. Gas header and distribution piping (106) comprises the main transport network carrying working gas from the master control valve to the distribution manifolds. Distribution manifolds (107) receive gas from the piping network and regulate flow to specific spacecraft zones, incorporating precision flow control elements responsive to shield control unit commands. Gas dispenser units (108) represent the terminal discharge points mounted on the spacecraft's exterior surface, engineered to disperse gas in controlled patterns based on their specific hull locations. Distribution piping (109) branches from the manifolds to individual gas dispenser units, designed to minimize pressure losses while maintaining structural integrity under operational stresses.

Figure 2A:
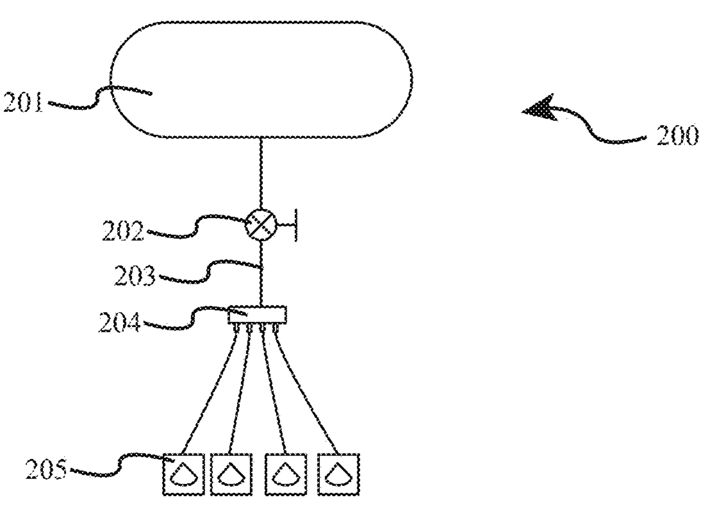
FIG. 2*a* is a schematic diagram of a minimal system configuration in accordance with an embodiment showing the working gas containment tank, master control valve, gas header piping, distribution manifolds, and gas dispenser units.

FIG. 2*a* illustrates a minimal system configuration suitable for smaller spacecraft or limited mission durations. The working gas containment tank (201) stores the working gas in a single pressurized vessel. The master control valve (202) provides system-wide on/off control. Gas header piping (203) transports gas from the master control valve to the distribution system. Distribution manifolds (204) regulate gas flow to designated spacecraft zones with simplified control mechanisms. Gas dispenser units (205) provide the final gas discharge points strategically positioned on critical spacecraft surfaces requiring thermal protection.

Figure 2B:
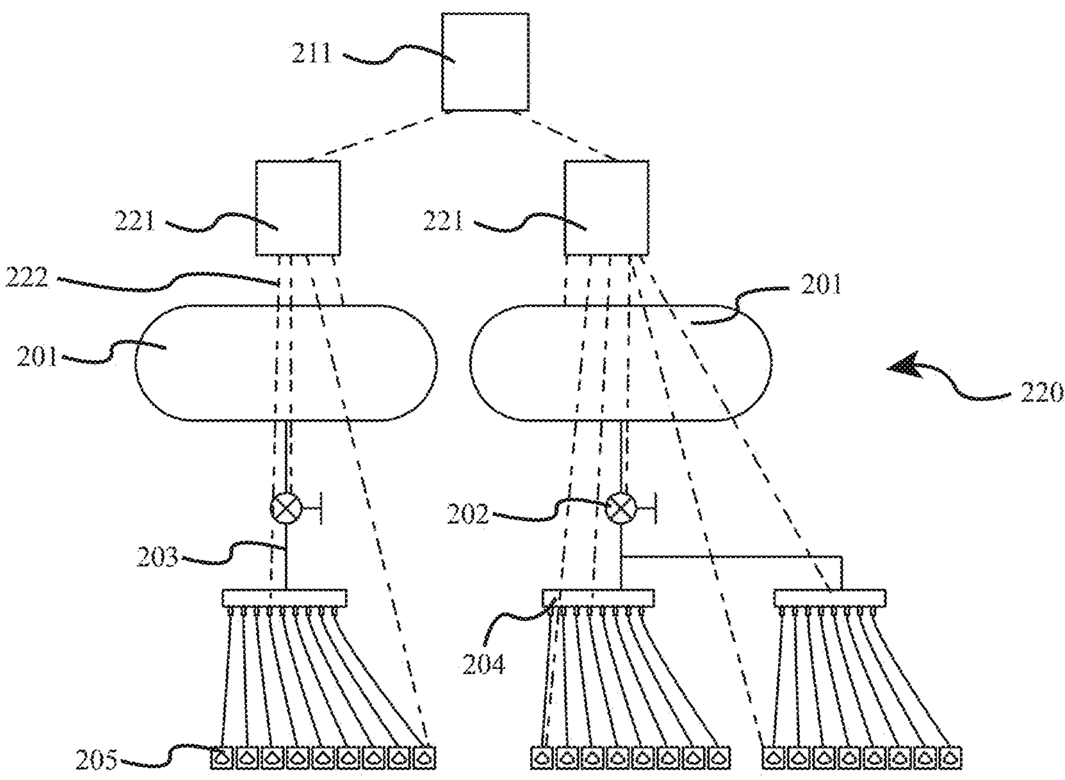
FIG. 2*b* is a schematic diagram of the minimal system configuration of FIG. 2*a* further including the distributed control system, shield control unit, and command lines in accordance with an embodiment.

FIG. 2*b* expands the minimal configuration of FIG. 2*a* by incorporating active control elements. The distributed control system (220) provides enhanced monitoring and control capabilities beyond the basic minimal system. The shield control unit (221) processes sensor data and commands the distribution manifolds based on real-time thermal conditions. Command lines (222) enable communication between the shield control unit and the distribution manifolds, allowing dynamic adjustment of gas flow rates and pressures to maintain spacecraft hull temperatures within safe operating limits.

Figure 2C:
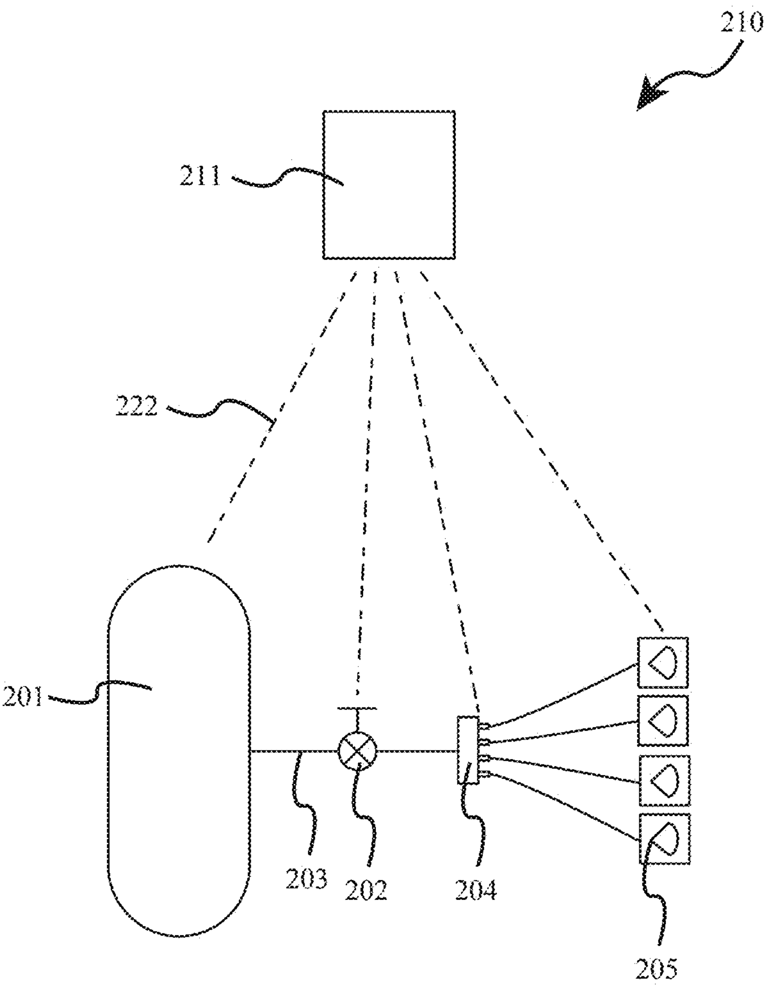
FIG. 2*c* is a schematic diagram showing a large system configuration with the shield control unit, command lines, and multiple distribution manifolds and gas dispenser units in accordance with an embodiment.

FIG. 2*c* depicts a large system configuration (210) designed for complex spacecraft geometries requiring comprehensive thermal protection coverage. Multiple distribution manifolds and gas dispenser units provide granular control across extensive spacecraft surface areas. The shield control unit (221) coordinates the operation of numerous distribution manifolds through command lines (222), enabling sophisticated thermal management strategies tailored to varying regional heating conditions across the spacecraft surface.

Figure 3:
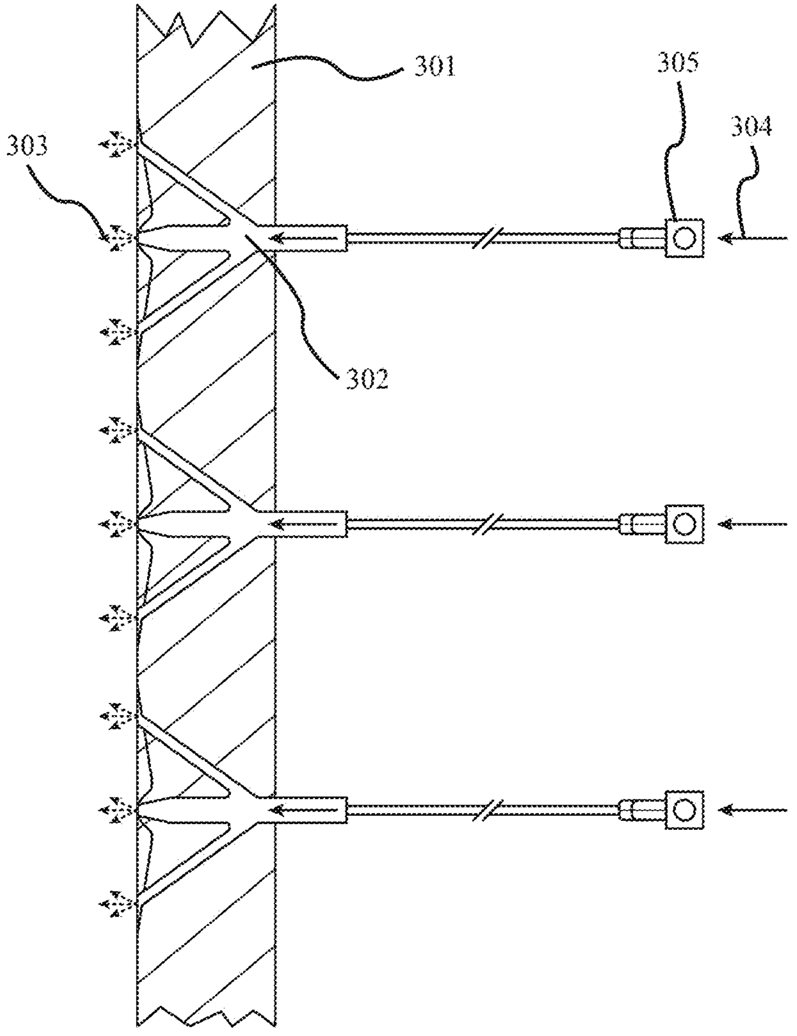
FIG. 3 is a side view of a portion of a spacecraft showing the active thermal protection system in operation with normal flow gas dispersion, gas flow, and distribution manifold valve in accordance with an embodiment.

FIG. 3 presents a side view of a spacecraft (301) demonstrating the active thermal protection system during operational deployment. The normal flow gas system configuration (302) shows gas dispenser units directing working gas approximately perpendicular to the spacecraft hull surface. Gas dispersion (303) illustrates the controlled release pattern of working gas creating a protective envelope around critical spacecraft surfaces. Gas flow (304) demonstrates the directional movement of working gas from the dispenser units into the external atmospheric environment. The distribution manifold valve (305) controls the gas flow rate to specific regions of the spacecraft surface based on local thermal conditions and shield control unit commands.

Figure 4:
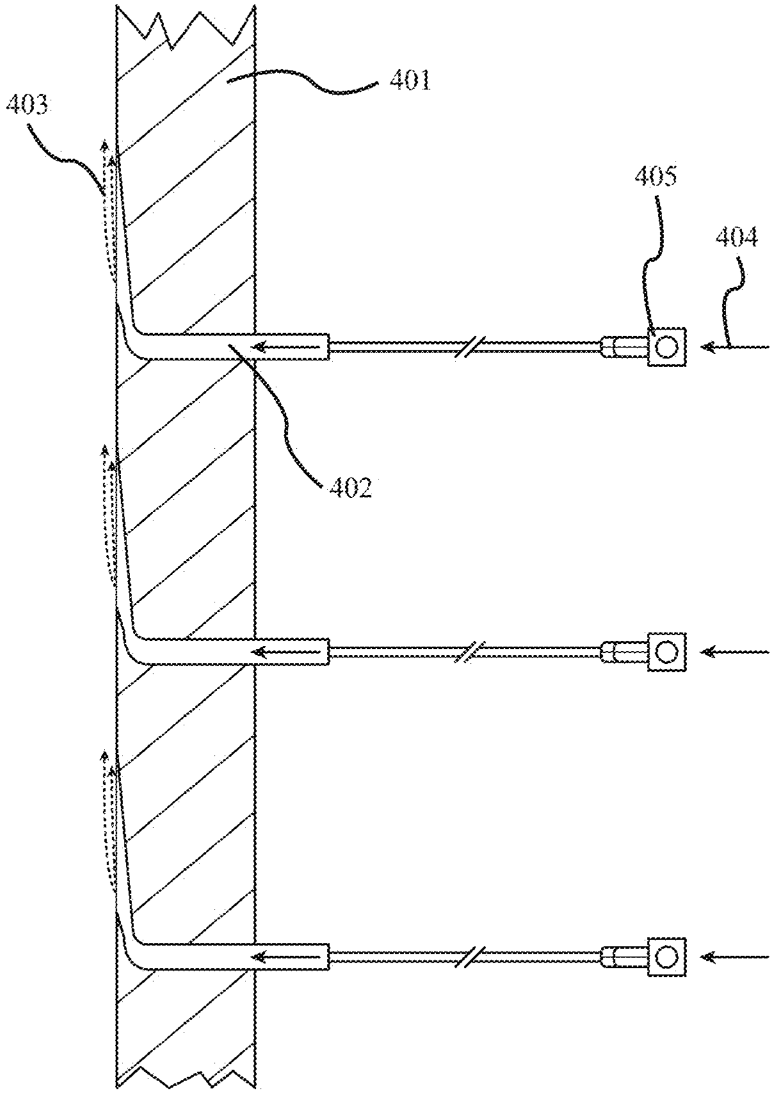
FIG. 4 is a side view of a portion of a spacecraft showing a parallel flow system configuration with gas dispersion, gas flow, and distribution manifold valve in accordance with an embodiment.

FIG. 4 illustrates a spacecraft (401) employing a parallel flow system configuration (402) where gas dispenser units direct working gas approximately parallel to the spacecraft hull surface. Gas dispersion (403) shows the fan-like distribution pattern created by parallel flow gas dispenser units along the spacecraft surface. Gas flow (404) indicates the directional movement of working gas parallel to the hull, creating an insulating boundary layer. The distribution manifold valve (405) regulates gas flow to the parallel flow dispenser units, enabling precise control of the protective gas film thickness and coverage.

Figure 5A:
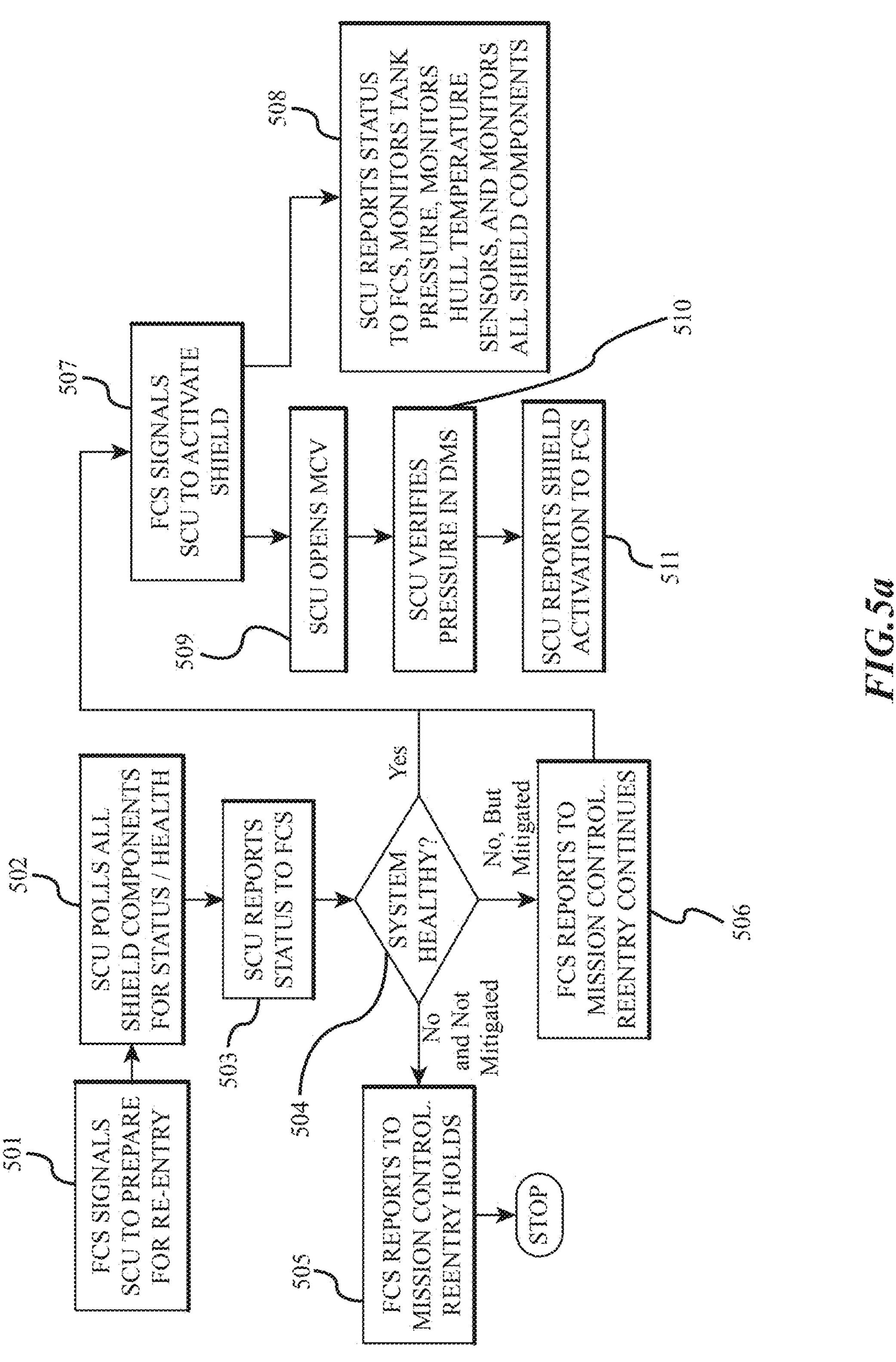
FIG. 5*a* shows the shield activation sequence and monitoring functions, in accordance with an embodiment, depicting the preparation phase (FCS signaling SCU, component health checks, status reporting) and the initial activation steps (opening MCV, verifying pressures, reporting shield activation to FCS), along with the continuous monitoring functions the SCU performs during operation.
Figure 5B:
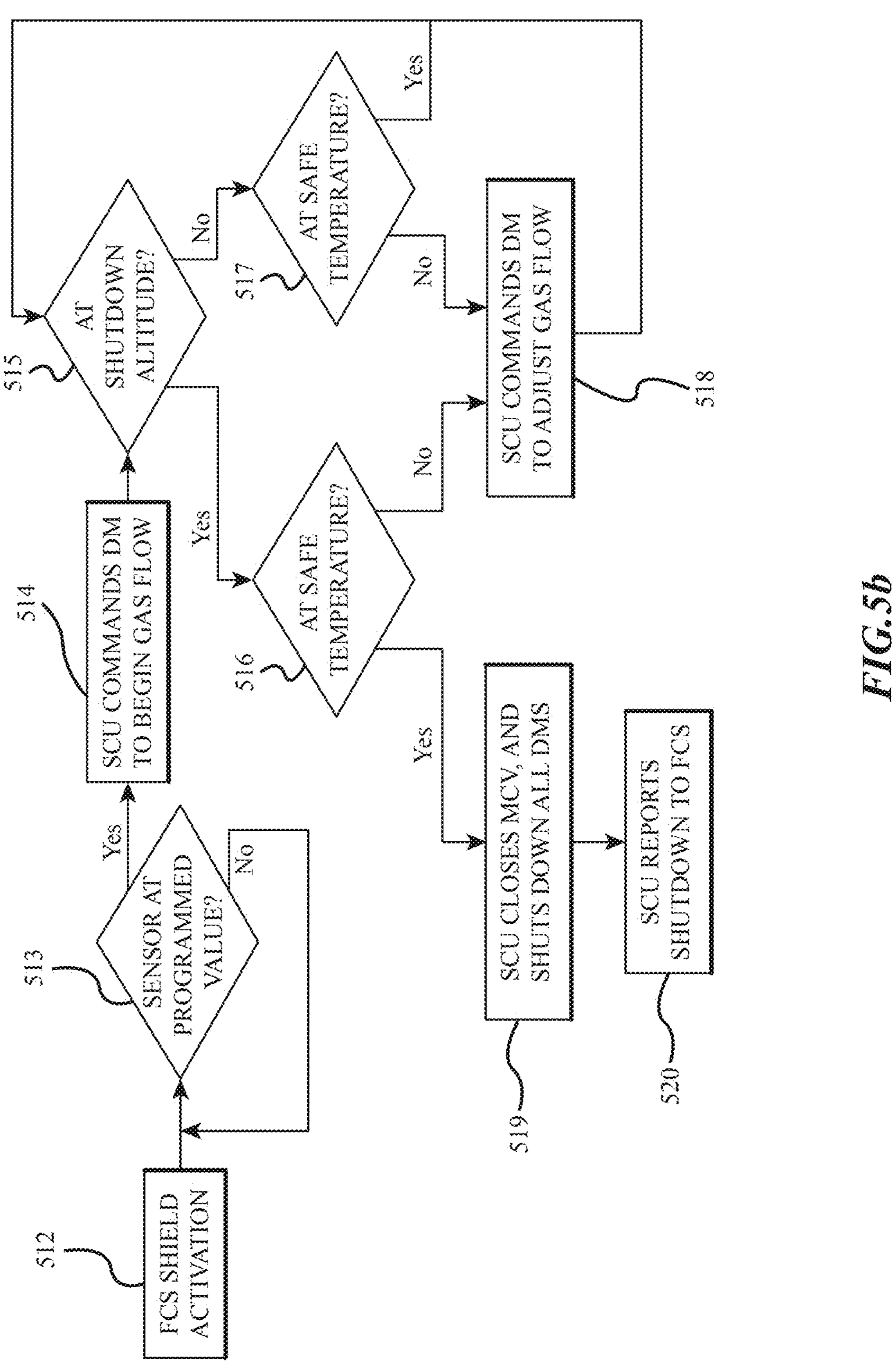
FIG. 5*b* shows the operational control logic and shutdown sequence in accordance with an embodiment, depicting the decision-making process during operation (monitoring sensor values, commanding gas flow adjustments) and the complete shutdown procedure when termination criteria are met.

FIG. 5*a* and FIG. 5*b* present comprehensive operational flowcharts detailing the sequence of operations for the active thermal protection system. The flowcharts illustrate the systematic preparation phase where the flight control system signals the shield control unit to prepare for atmospheric entry, followed by component health verification and status reporting procedures. The activation sequence shows the coordinated opening of the master control valve, pressure verification in distribution manifolds, and confirmation of system readiness. During the operational phase, the shield control unit continuously monitors temperature sensors at gas dispenser unit locations, commanding distribution manifolds to initiate and adjust gas flow as thermal thresholds are reached. The shutdown sequence demonstrates the systematic termination of gas flow when predetermined altitude and temperature criteria are satisfied, ensuring safe deactivation of the thermal protection system.

Figure 6:
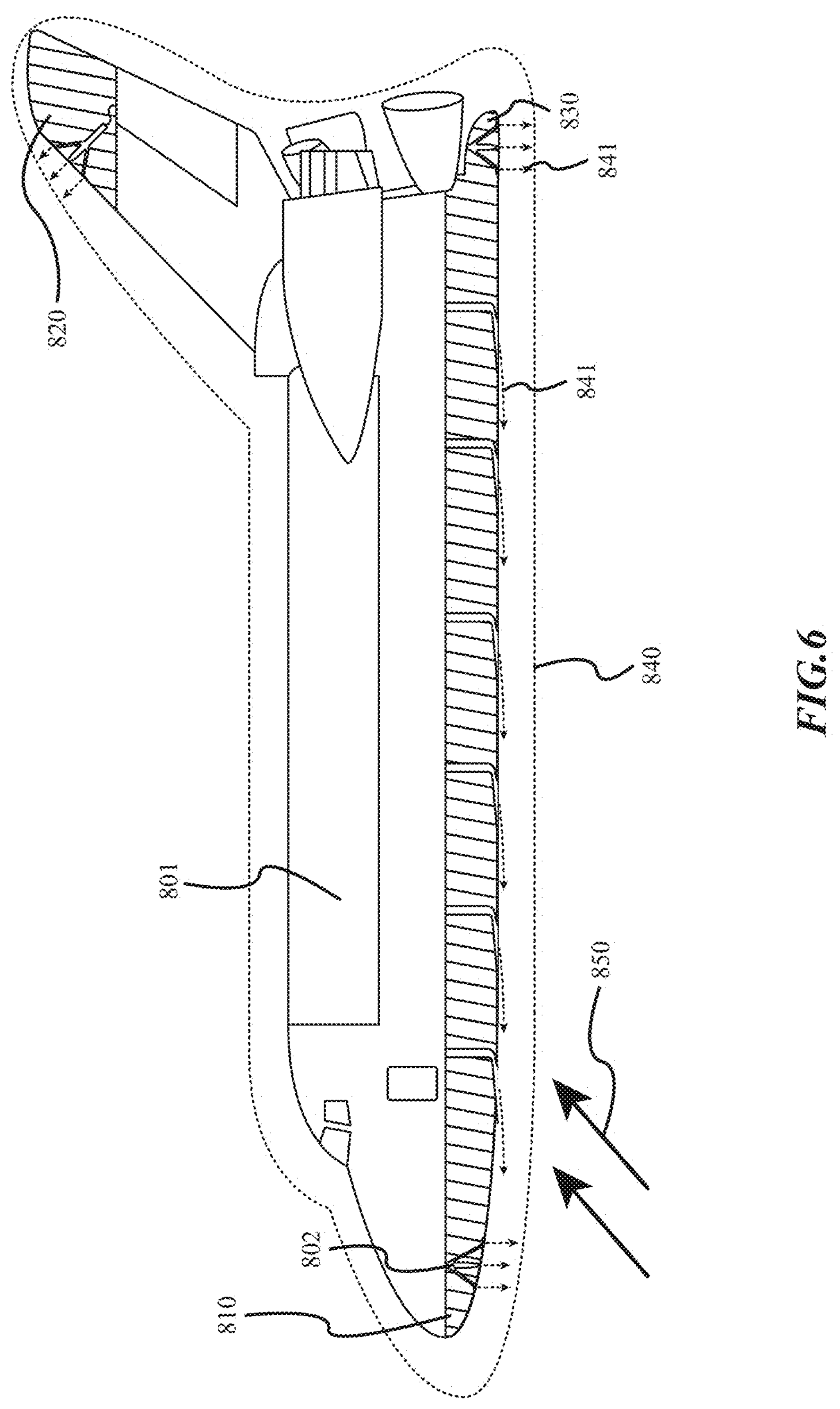
FIG. 6 is a side view of a spacecraft during atmospheric entry showing the gas shield, gas dispersion, and relative wind interaction with the thermal protection system in accordance with an embodiment.

FIG. 6 depicts a spacecraft (801) during atmospheric entry conditions, illustrating the interaction between the active thermal protection system and the external atmospheric environment. The gas shield (840) represents the protective envelope created by the continuous exudation of working gas from the spacecraft surface. Gas dispersion (841) shows the controlled release of working gas creating a barrier between the spacecraft structure and the high-temperature atmospheric gases. The relative wind (850) indicates the direction and intensity of atmospheric flow encountered during hypersonic flight, demonstrating how the exuded gas interacts with and deflects the incoming high-temperature plasma and ionized gases away from the spacecraft surface.

Figure 7:
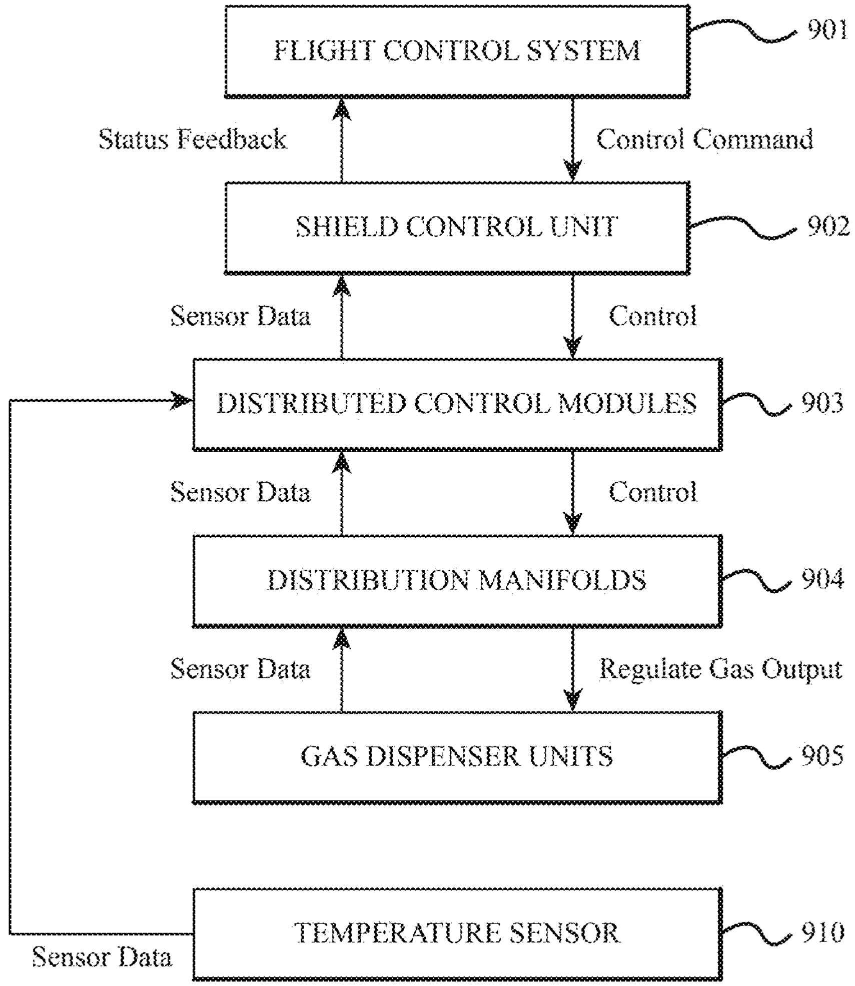
FIG. 7 depicts a control system diagram showing the relationship between the flight control system, shield control unit, distributed control modules, distribution manifolds, gas dispenser units, and temperature sensors in accordance with an embodiment.

FIG. 7 illustrates the hierarchical control system architecture showing the operational relationships between system components. The flight control system (901) provides overall mission coordination and interfaces with the shield control unit (902) for thermal protection system activation and monitoring. The shield control unit (902) processes sensor data and coordinates the operation of distributed control modules (903) in larger system configurations. Distributed control modules (903) manage specific spacecraft regions, controlling local distribution manifolds (904) based on thermal conditions within their assigned zones. Distribution manifolds (904) regulate gas flow to individual gas dispenser units (905) based on commands from the control hierarchy. Gas dispenser units (905) provide the final discharge points where working gas is released to create the protective thermal barrier. Temperature sensors (910) monitor thermal conditions at or near the gas dispenser units, providing critical feedback data to the control system for dynamic adjustment of gas flow rates and pressures.

Figure 8:
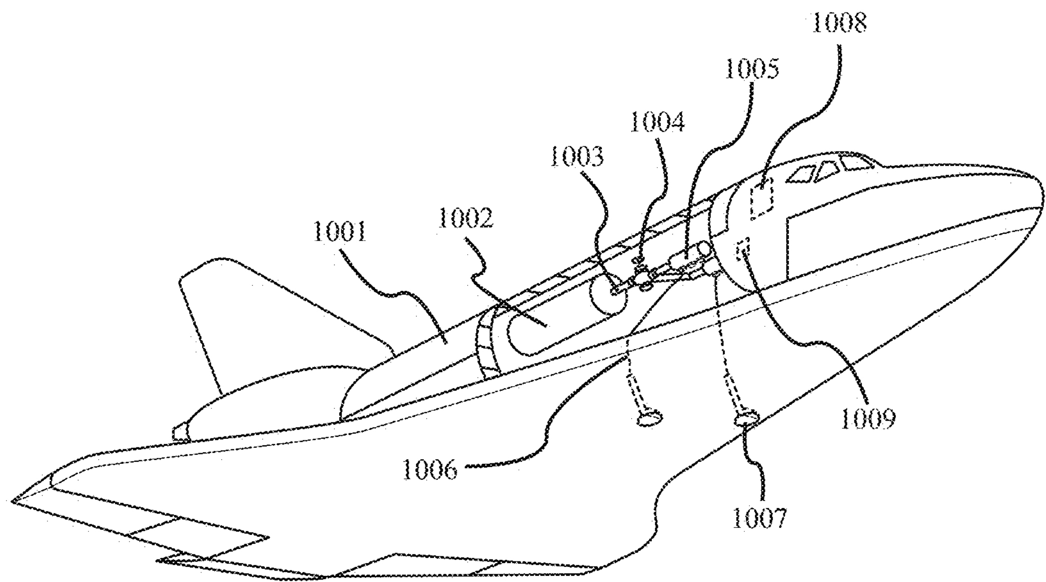
FIG. 8 depicts a perspective view of a spacecraft showing the working gas containment tank, gas header piping, master control valve, distribution manifolds, gas dispenser unit piping, gas dispenser units, flight control system, and shield control unit in accordance with an embodiment.

FIG. 8 provides a perspective view of a spacecraft (1001) showing the physical integration of system components. The working gas containment tank (1002) is positioned within the spacecraft structure to minimize mass impact while ensuring adequate gas supply. Gas header piping (1003) routes working gas from the storage system to the distribution network. The master control valve (1004) provides primary system control, positioned for operational reliability and maintenance access. Distribution manifolds (1005) are strategically located throughout the spacecraft to enable zoned gas distribution. Gas dispenser unit piping (1006) connects the distribution manifolds to individual gas dispenser units (1007) mounted on the spacecraft exterior surface. The flight control system (1008) integrates with spacecraft avionics for coordinated thermal protection management. The shield control unit (1009) provides dedicated thermal protection system control, processing sensor data and commanding gas flow adjustments throughout the atmospheric entry phase.

Figure 9:
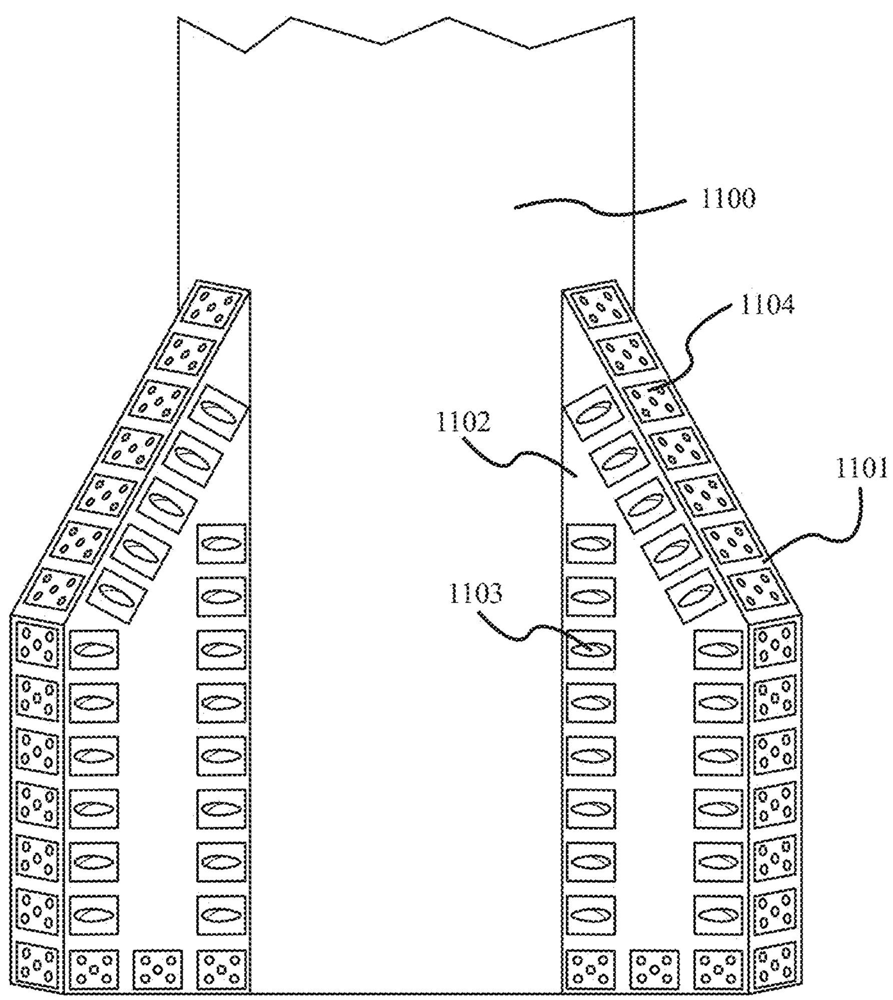
FIG. 9 depicts a partial view of a spacecraft showing gas dispenser units positioned on wing perimeter surfaces and wing area surfaces, with parallel flow gas dispenser units and normal flow gas dispenser units in accordance with an embodiment.

FIG. 9 presents a bottom view of a spacecraft (1100) illustrating the strategic placement of gas dispenser units on wing surfaces. Wing perimeter surfaces (1101) employ gas dispenser units positioned along leading edges and wing tips where airflow changes direction create concentrated heating zones. Wing area surfaces (1102) utilize gas dispenser units distributed across primary wing surfaces to provide comprehensive thermal protection coverage. Parallel flow gas dispenser units (1103) are positioned on wing area surfaces where atmospheric flow is predominantly parallel to the surface, directing working gas along the hull to reinforce and thicken the boundary layer. Normal flow gas dispenser units (1104) are positioned at wing perimeter locations experiencing direct impingement of high-temperature atmospheric gases, directing working gas approximately perpendicular to the spacecraft surface to create local displacement of incoming hot gases.

At its core, the invention creates a protective gas envelope around critical surfaces of the spacecraft during the high-heating phases of atmospheric entry. This gas layer serves multiple functions: it insulates the spacecraft surface from direct contact with superheated atmospheric gases, carries away heat that would otherwise transfer to the spacecraft structure, and deflects high-temperature plasma and ionized gases that form during hypersonic flight through the atmosphere. By actively controlling the flow of this protective gas layer through a sophisticated distribution and control system, the invention can adjust thermal protection dynamically in response to changing conditions during the entry trajectory.

The active gas-exuding heat shield system comprises several integrated subsystems working in harmony. A central gas storage system holds the working gas, preferably helium due to its favorable thermal properties and extremely low boiling point. This gas is distributed through a network of piping and manifolds to numerous Gas Dispenser Units (GDUs) strategically positioned across the spacecraft's surface. The GDUs, which represent a key innovative element of the invention, are specially designed to exude gas in patterns that maximize thermal protection based on their specific location on the spacecraft. Some GDUs direct gas perpendicular to the spacecraft hull, while others direct it parallel to the surface, creating an effective boundary layer that shields the spacecraft structure.

Control of this system is managed through a hierarchical arrangement of electronic components. The Shield Control Unit (SCU) monitors temperature sensors distributed across the spacecraft surface and commands the Distribution Manifolds (DMs) to adjust gas flow rates to maintain hull temperatures within safe operating limits. The SCU interfaces with the spacecraft's Flight Control System (FCS), enabling coordinated activation and deactivation of the thermal protection system at appropriate points in the flight trajectory.

The system can be implemented in several configurations depending on spacecraft size and mission requirements. These range from minimal systems suitable for smaller vehicles to large systems with distributed control modules for complex spacecraft geometries. In all configurations, the fundamental principle remains the same: active, controlled exudation of gas to create a protective thermal barrier during the critical phases of atmospheric entry.

The following detailed description will explain the components, configurations, and operational sequences of the invention, as well as its performance characteristics and integration considerations. While certain preferred embodiments are described, it should be understood that various modifications and adaptations may be made without departing from the spirit and scope of the invention.

In an exemplary embodiment of the invention, the active gas-exuding heat shield system provides thermal protection for spacecraft during atmospheric entry or reentry through a coordinated network of components that work together to create a protective gas layer around critical surfaces of the spacecraft. This section describes the basic components of the system and various configurations in which they may be implemented.

In a preferred embodiment of the invention, the active gas-exuding heat shield system comprises the following essential components:

The Working Gas Containment Tank serves as the primary reservoir for the coolant gas used in the thermal protection system. This pressurized vessel stores the working gas, preferably helium due to its superior thermal properties and extremely low boiling point. The tank is constructed of lightweight, high-strength materials capable of withstanding the internal pressures required for system operation while minimizing mass impact to the spacecraft. The tank may be shared with other spacecraft systems, such as propellant pressurization, when the working gases are compatible.

The Master Control Valve acts as the primary on/off control for the entire active shield system. This high-reliability valve regulates the initial release of working gas from the containment tank to the distribution system and is designed with redundant actuation mechanisms to ensure operational reliability during critical mission phases.

Distribution Manifolds receive gas from the MCV and regulate its flow to specific zones of the heat shield. Multiple DMs are strategically positioned throughout the system to enable precise control of gas distribution to different regions of the spacecraft surface based on localized heating conditions. Each DM includes precision flow control elements that adjust gas pressure and flow rates in response to commands from the Shield Control Unit.

The Gas Header and Distribution Piping network transports the working gas from the containment tank through the MCV to the DMs and then to the Gas Dispenser Units. The header piping serves as the main gas transport pathway, while the distribution piping branches to individual GDUs or, alternatively, to gas-tight cavities containing multiple GDUs. For weight savings, hull sections may be divided into gas-tight cavities similar to double hulls on watercraft, where multiple GDUs are positioned on the spacecraft exterior surface within each cavity. In this configuration, DMs control gas pressure to the cavities as a whole, with no direct piping to individual GDUs, and the gas pressure within the cavities feeds the GDUs. This approach results in control of each cavity's GDUs as a group rather than individually. The piping network is designed to minimize pressure losses while maintaining structural integrity under the thermal and mechanical stresses of atmospheric entry.

Gas Dispenser Units represent a key innovative element of the invention. These specialized units are mounted on the spacecraft's external surface and serve as the final discharge points for the working gas. The GDUs are engineered to disperse gas in carefully controlled patterns that maximize thermal protection based on their specific location on the spacecraft hull. They are available in multiple configurations, including normal flow (perpendicular to hull) and parallel flow (along hull) variants, designed to create an effective boundary layer that shields the spacecraft structure.

The Shield Control Unit functions as the dedicated electronic controller for the active heat shield system. It monitors the system status, processes temperature sensor data from the GDUs, and commands the DMs to adjust gas flow rates to maintain hull temperatures within safe operating limits. The SCU includes built-in diagnostic capabilities and multiple redundant processing systems to ensure reliable operation during the critical reentry phase.

The Flight Control System represents the spacecraft's primary avionics system that interfaces with the SCU to activate and deactivate the heat shield at appropriate points in the flight trajectory. The FCS provides overall mission coordination, while delegating the detailed thermal management to the SCU.

Command and Signal Lines provide the communication pathways that transmit control commands and feedback data between the various system components, enabling coordinated operation of the entire system. These electrical or optical pathways employ radiation-hardened, high-reliability designs to ensure dependable communication during all mission phases.

The exemplary embodiment of the invention can be implemented in several configurations depending on spacecraft size, mission requirements, and thermal protection needs.

The Minimal System Configuration represents the simplest implementation, suitable for smaller spacecraft or limited mission durations. In this arrangement, a single working gas tank feeds a single MCV, which in turn supplies a limited number of DMs controlling gas flow to strategically placed GDUs. The SCU directly controls all DMs without intermediate control modules. This configuration minimizes system complexity and mass while providing effective thermal protection for less demanding mission profiles.

For larger spacecraft or missions with more severe reentry conditions, the Large System Configuration employs multiple working gas tanks, redundant MCVs, and a greater number of DMs and GDUs to provide comprehensive coverage of the spacecraft surface. The increased component count allows for more granular control of thermal protection across the vehicle surface, with different regions receiving tailored cooling based on their specific thermal requirements.

The most sophisticated implementation is the Distributed System Configuration with Distributed Control Modules. This configuration introduces an additional control layer in the form of Distributed Control Modules between the SCU and the DMs. Each DCM manages a specific "shield module" comprising multiple DMs and their associated GDUs. This hierarchical control architecture enables highly localized thermal management decisions while maintaining overall coordination through the SCU. The distributed architecture enhances system reliability through partial redundancy and facilitates implementation on very large spacecraft with complex geometries requiring differentiated thermal protection strategies across various regions.

In all configurations of the preferred embodiment, the fundamental principles of operation remain consistent: the controlled exudation of gas to create a protective thermal barrier during the critical phases of atmospheric entry. The specific configuration selected for implementation would depend on the particular spacecraft's size, mission profile, and thermal protection requirements.

The Gas Dispenser Units (GDUs) represent a critical innovation in the active gas-exuding heat shield system. These specialized devices are mounted on the exterior surface of the spacecraft and serve as the interface between the internal gas distribution system and the external atmospheric environment. The GDUs are designed to disperse the working gas in precisely controlled patterns that create an effective thermal barrier between the spacecraft structure and the high-temperature atmospheric gases encountered during entry or reentry.

The system employs two primary types of GDUs, each optimized for specific locations and thermal protection requirements on the spacecraft surface.

Normal flow GDUs direct the working gas approximately perpendicular to the spacecraft hull. This configuration is particularly effective in areas experiencing direct impingement of high-temperature atmospheric gases, such as stagnation points and leading edges. The perpendicular flow creates a strong local displacement of the incoming hot gas, effectively pushing the high-temperature region away from the spacecraft surface. Normal flow GDUs typically incorporate multiple nozzle orifices arranged to provide uniform coverage over their designated protection area.

Parallel flow GDUs, by contrast, direct the working gas in a direction approximately parallel to the spacecraft hull. This design is optimized for areas where the atmospheric flow is predominantly parallel to the surface, such as the primary body surfaces of the spacecraft. The parallel gas injection reinforces and thickens the boundary layer, creating an insulating gas film that separates the hot external flow from the spacecraft surface. Parallel flow GDUs generally employ a single, elongated nozzle orifice designed to produce a fan-like gas dispersion pattern along the surface.

GDUs are precision-engineered components manufactured using advanced materials and production techniques to ensure reliable performance in the extreme conditions of atmospheric entry.

The preferred embodiment utilizes metallic construction for the GDUs, providing excellent thermal conductivity, structural integrity, and resistance to the high temperatures and pressures experienced during operation. The specific alloys employed would be selected based on their compatibility with the spacecraft structure, thermal expansion characteristics, and resistance to oxidation and erosion. In alternative embodiments, high strength and thermal resistant resins serve as an alternative or complementary material for use in the GDUs.

Advanced additive manufacturing techniques, commonly known as 3D printing, enable the production of GDUs with complex internal geometries that would be difficult or impossible to achieve using conventional manufacturing methods. This approach allows for the creation of monolithic structures with integrated gas channels, reducing the number of joints and potential failure points and to minimize the total mass of the unit.

A particularly effective design incorporates a monolithic honeycomb structure that provides exceptional strength-to-weight ratio while accommodating the internal gas flow paths. This construction method minimizes mass while maintaining the structural integrity necessary to withstand the mechanical and thermal stresses of the mission.

The GDUs feature integral gas flow channels precisely designed to deliver the working gas from the distribution piping to the nozzle orifices with minimal pressure loss and optimal flow characteristics. These channels may incorporate flow conditioning features such as diffusers, turning vanes, or expansion chambers to ensure the desired gas dispersion pattern at the nozzle exit.

The GDUs incorporate several key design features that enhance their performance and adaptability to different spacecraft geometries and mission requirements.

Each GDU is contoured to match the local hull geometry at its installation location, ensuring a smooth external surface that minimizes aerodynamic disturbances. This custom contouring is critical for maintaining the designed aerodynamic characteristics of the spacecraft and preventing localized heating due to flow disturbances.

The recesses or orifices through which the working gas is dispensed are adjustable in both size and orientation, allowing the flow patterns to be optimized for specific locations on the spacecraft. This adjustability enables fine-tuning of the thermal protection system during development and testing.

Depending on the specific requirements of their installation location, GDUs may feature multiple nozzles to provide broader coverage or a single nozzle for concentrated protection. Multiple-nozzle configurations are typically employed in areas requiring uniform protection over a larger surface area, while single-nozzle designs are used where a directed, high-momentum gas flow is needed to counter particularly intense localized heating.

The working gas system comprises all components involved in the storage, distribution, and control of the gas used to create the protective thermal barrier. This subsystem is fundamental to the operation of the active heat shield and includes several interdependent elements carefully designed to ensure reliable performance throughout the mission.

The selection of an appropriate working gas is critical to the effectiveness of the active heat shield system. The gas must possess specific physical properties that optimize its thermal protection capabilities while remaining compatible with the system components and spacecraft operations.

Helium is the preferred working gas for the system due to its exceptional physical characteristics. As the second lightest element, helium provides significant volumetric expansion when released from the high-pressure storage tank, resulting in efficient use of the limited gas mass that can be carried aboard the spacecraft. Its extremely low boiling point of −268.9° C. (4.2K) ensures that it remains in gaseous form throughout the system under all operating conditions, eliminating concerns about phase changes that could affect flow consistency.

Additionally, helium is chemically inert, non-toxic, and non-flammable, making it safe to use in the vicinity of other spacecraft systems and safe for crew if used on crewed vehicles. Its high specific heat capacity allows it to absorb substantial thermal energy while experiencing relatively small temperature increases, enhancing its effectiveness as a thermal barrier.

The low molecular weight of helium also provides advantages in boundary layer control. When exuded into the boundary layer, helium creates a significantly thicker displacement effect than heavier gases at the same mass flow rate. This results in more effective pushing of the hot external flow away from the spacecraft surface, improving thermal protection efficiency.

The distribution system is responsible for delivering the working gas from the storage tank to the GDUs at the appropriate pressure and flow rate to maintain effective thermal protection during atmospheric entry.

The header piping network serves as the primary gas transport pathway from the MCV to the various Distribution Manifolds located throughout the spacecraft. This network is designed with sufficient diameter to minimize pressure losses while maintaining the structural integrity necessary to withstand the pressure differentials and mechanical stresses experienced during flight.

Multiple Distribution Manifolds are strategically positioned to provide zoned control of the gas flow to different regions of the spacecraft surface. Each DM receives gas from the header piping and regulates its flow to the GDUs within its control zone based on commands from the SCU. This zoned approach allows the system to deliver varying amounts of gas to different areas of the spacecraft in response to the non-uniform heating patterns typically encountered during atmospheric entry.

The system maintains precise control over gas flow rates and pressures throughout the distribution network, enabling the SCU to adjust the thermal protection in real-time based on sensor feedback. This control capability is essential for optimizing gas usage while ensuring adequate protection across all spacecraft surfaces experiencing significant heating.

The control systems of the active gas-exuding heat shield coordinate the operation of all components to provide effective thermal protection throughout the atmospheric entry phase. These systems comprise both dedicated hardware components and sophisticated software algorithms that work together to monitor conditions, make decisions, and implement protective actions.

The Shield Control Unit serves as the central controller for the active heat shield system, integrating sensor data, executing control algorithms, and commanding the various system components.

Throughout operation, the SCU continuously monitors tank pressure to ensure sufficient working gas remains available for the completion of the entry phase. This monitoring includes predictive algorithms that estimate gas consumption based on the current and anticipated heating conditions, enabling the SCU to optimize gas usage to ensure protection throughout the entire entry profile.

Based on temperature data received from sensors at or near the GDUs, the SCU controls gas flow rates to each Distribution Manifold, ensuring that hull temperatures remain within safe operating limits. The control algorithms incorporate both feedback control based on current temperature readings and feedforward control based on predicted heating patterns derived from the entry trajectory.

The SCU maintains hull temperatures by implementing sophisticated thermal management strategies that balance protection requirements against gas consumption. Rather than simply maximizing gas flow to all regions, the SCU prioritizes gas allocation to the areas experiencing the most severe heating while providing just enough flow to other regions to maintain safe temperatures.

Throughout the entry phase, the SCU maintains continuous communication with the Flight Control System, providing status updates, receiving trajectory information, and coordinating shield operations with overall vehicle management. This integration ensures that the thermal protection system operates in harmony with other spacecraft systems and responds appropriately to any changes in the entry profile.

The Flight Control System (FCS) represents the spacecraft's primary avionics system and interfaces with the SCU to coordinate the operation of the active heat shield within the broader context of the mission.

The FCS is responsible for coordinating the activation and deactivation of the heat shield at the appropriate points in the flight trajectory. Based on altitude, velocity, atmospheric density, and other parameters, the FCS determines when to initiate shield operation before significant heating begins and when to terminate operation after the high-heating phase has passed.

Throughout the entry phase, the FCS continuously monitors the status of the heat shield system through data provided by the SCU. This monitoring includes shield component health, gas consumption rates, and thermal protection effectiveness. The FCS uses this information to assess the overall status of the spacecraft and implement contingency procedures if necessary.

The FCS maintains ultimate control over the reentry operations, making high-level decisions about trajectory adjustments, attitude control, and other factors that affect the thermal environment experienced by the spacecraft. The SCU implements the thermal protection strategy within the parameters established by these FCS decisions.

The integration between the FCS and SCU represents a critical aspect of the invention, ensuring that thermal protection is coordinated with other spacecraft systems and operations to provide safe and reliable atmospheric entry under a wide range of conditions.

The active gas-exuding heat shield system follows well-defined operational sequences during different phases of the mission. These sequences ensure proper preparation, activation, management, and deactivation of the system to provide effective thermal protection throughout the atmospheric entry process.

Prior to initiating atmospheric entry, the system undergoes a series of preparatory operations to ensure readiness for the high-heating environment that will be encountered.

The preparation phase begins when the FCS signals the SCU to prepare for entry, typically occurring several minutes to hours before the actual entry interface, depending on the specific mission profile.

Upon receiving the preparation command, the SCU conducts a comprehensive verification of all heat shield components. This verification includes checking the pressure and temperature of the working gas in the storage tank, confirming the operational status of the MCV and all DMs, verifying communication with all temperature sensors, and testing the response of all controllable elements.

The SCU provides detailed status reporting to the FCS, including the results of all component checks and any identified anomalies. This reporting allows the flight crew or ground controllers to assess the readiness of the thermal protection system before committing to the entry.

If any anomalies are detected during the verification process, the SCU implements predefined problem mitigation procedures appropriate to the specific issue. These procedures may include activating redundant components, adjusting operational parameters to compensate for degraded performance, or implementing modified control strategies that prioritize protection of critical areas while accepting reduced performance in less critical regions.

The activation sequence begins when the FCS determines that entry heating will soon commence, typically at an altitude of approximately 120-130 kilometers depending on the entry trajectory and planetary atmosphere.

The FCS initiates the activation sequence by sending a command to the SCU, which then implements a coordinated series of actions to bring the active heat shield system to operational status.

The SCU first verifies that all system components remain in the expected state following the preparation phase, ensuring that no changes or anomalies have occurred in the intervening time.

After verification, the SCU commands the MCV to open, allowing pressurized working gas to flow from the storage tank into the header piping network. The SCU monitors the pressure in the distribution system to confirm that gas is flowing as expected and that no blockages or leaks are present.

As gas fills the header piping and reaches the DMs, the SCU confirms proper pressurization throughout the distribution system. Initially, the DMs remain closed, preventing gas flow to the GDUs until thermal protection is required.

Once the distribution system is properly pressurized, the SCU signals the FCS that the shield is active and ready to provide thermal protection. At this point, the system is prepared to respond immediately to increasing thermal loads as the spacecraft encounters the atmosphere.

During the atmospheric entry phase, the system actively manages the distribution of working gas to provide effective thermal protection as the spacecraft experiences increasing, and then decreasing, aerodynamic heating.

As the spacecraft begins to experience aerodynamic heating, the temperature sensors at or near the GDUs detect the increasing thermal load and transmit this data to the SCU.

The SCU continuously monitors temperature readings from all sensors distributed across the spacecraft surface, comparing these values against predetermined thresholds established for each location. When the temperature at a particular location approaches its threshold, the SCU commands the corresponding DM to begin flowing working gas to the affected GDUs.

Throughout the entry phase, the SCU dynamically adjusts gas flow rates to each region of the spacecraft based on the evolving thermal environment. Areas experiencing more intense heating receive increased gas flow, while areas with lower heating may receive reduced flow to conserve the limited gas supply.

The SCU maintains precise control over system pressures throughout the gas distribution network, ensuring that each DM receives adequate supply pressure while preventing excessive pressure differentials that could stress system components or lead to uneven gas distribution.

In configurations employing Distributed Control Modules, the SCU coordinates the actions of multiple DCMs to implement a coherent thermal protection strategy across the entire spacecraft.

Each DCM manages the thermal protection for its assigned zone, monitoring local temperatures and controlling gas flow to the GDUs within its jurisdiction. This localized control enables rapid response to changing thermal conditions without requiring continuous intervention from the central SCU.

The SCU provides overall coordination of the DCMs, establishing protection priorities, allocating gas resources, and ensuring consistent protection across zone boundaries. This hierarchical control approach combines the advantages of local responsiveness with global optimization.

Throughout the entry phase, the control system makes real-time adjustments to gas distribution based on both the current thermal conditions and predictions of future heating. This predictive capability enables proactive protection rather than merely reactive response, improving overall system effectiveness.

As the spacecraft descends to lower altitudes and aerodynamic heating diminishes, the system implements a controlled shutdown sequence to conserve remaining gas and transition to normal flight operations.

The shutdown sequence is initiated when predetermined termination criteria are met, typically based on a combination of altitude, velocity, and thermal conditions.

The primary altitude parameter is established during mission planning based on the specific entry trajectory and atmospheric characteristics. For Earth reentry, this is typically around 35-40 kilometers altitude, where aerodynamic heating has diminished to levels that no longer threaten the spacecraft structure.

Temperature thresholds provide a secondary criterion for system shutdown. The SCU continuously monitors all temperature sensors and provides this data to the FCS. When all monitored points on the spacecraft hull have cooled below their respective safe thresholds, the system confirms that active thermal protection is no longer required.

When both the altitude parameter and temperature thresholds indicate that the high-heating phase of entry has passed, the FCS commands the SCU to initiate the shutdown sequence.

The shutdown sequence proceeds through a series of steps designed to safely deactivate the system while preventing pressure surges or other anomalies that could affect spacecraft operations. First, the SCU commands the MCV to close, stopping the flow of gas from the storage tank to the distribution system. Next, the SCU commands all DMs to gradually reduce flow and then close completely, ensuring a smooth transition rather than an abrupt cessation of protection. Finally, the SCU reports the completed shutdown to the FCS, which then transitions the spacecraft to normal atmospheric flight control.

This controlled shutdown sequence ensures that thermal protection remains available until no longer needed while preventing unnecessary consumption of the working gas that might be required for subsequent entries in multi-use applications.

The active gas-exuding heat shield system exhibits several key performance characteristics that differentiate it from traditional passive thermal protection systems and enable its exceptional reusability with minimal maintenance. The primary function of the system is to provide effective thermal protection for the spacecraft structure during the high-heating phases of atmospheric entry.

The system manages heat through several complementary mechanisms that work together to prevent excessive temperature rise in the spacecraft structure.

Gas exudation cooling represents the primary protective mechanism. As the working gas flows through the GDUs and into the boundary layer surrounding the spacecraft, it creates a buffer zone between the hot atmospheric gases and the vehicle surface. This buffer zone absorbs and carries away heat that would otherwise be transferred to the spacecraft structure. The continuous flow of fresh, cool gas maintains this protective buffer throughout the entry phase, regardless of the duration or intensity of the heating environment.

The exuded gas significantly alters the boundary layer characteristics around the spacecraft, creating a thicker, lower-density region that reduces heat transfer from the hot external flow to the vehicle surface. This boundary layer control effect is particularly pronounced when using helium as the working gas, due to its low molecular weight and high specific heat capacity.

The system actively regulates surface temperatures by adjusting gas flow rates in response to thermal sensor data. Areas experiencing higher heating receive increased gas flow, while areas with lower heating receive reduced flow to conserve gas. This dynamic adjustment ensures that all spacecraft surfaces remain below their maximum allowable temperatures throughout the entry phase, regardless of variations in the heating distribution.

Several factors influence the efficiency of the thermal protection system, affecting both its effectiveness and gas consumption rate.

Gas flow rates represent a critical efficiency factor, with higher flow rates generally providing enhanced thermal protection but consuming the limited gas supply more rapidly. The control system optimizes flow rates across the spacecraft surface to provide adequate protection while minimizing overall gas consumption.

The distribution patterns of the exuded gas significantly affect protection efficiency. The GDUs are designed to create optimal gas distribution patterns for their specific locations on the spacecraft, ensuring effective coverage without wasted flow. These patterns vary from broad, diffuse flows in areas with moderate heating to concentrated, high-momentum flows in regions experiencing intense heating.

Temperature control algorithms implemented in the SCU and DCMs continuously optimize the system's operation based on real-time thermal data and predictive models. These algorithms balance immediate protection requirements against anticipated future needs, ensuring that sufficient gas remains available throughout the entire entry phase while maintaining all spacecraft surfaces below their temperature limits.

The active gas-exuding heat shield system offers exceptional adaptability to varying entry conditions, unexpected events, and emergency situations. The system readily accommodates changes in the flight profile, whether planned or unplanned, through several adaptability features.

Variable flow rates enable the system to respond to different heating profiles associated with various entry trajectories. Shallow entries with prolonged moderate heating can be accommodated by maintaining lower flow rates over an extended period, while steep entries with intense but brief heating can be managed with temporarily higher flow rates.

Zone-specific control allows the system to adapt to asymmetric heating conditions that may result from off-nominal entry attitudes or trajectories. By independently adjusting gas flow to different regions of the spacecraft surface, the system maintains effective protection even when the heating distribution differs significantly from the nominal case.

The control system provides real-time response to changing conditions, continuously adjusting protection parameters based on actual measured temperatures rather than relying solely on predetermined profiles. This adaptability ensures effective protection even when the actual entry conditions deviate from pre-mission predictions.

The system incorporates various features to maintain protection in emergency or off-nominal situations.

Problem mitigation capabilities include the ability to compensate for failed or degraded components by redistributing gas flow through alternative paths, increasing flow to adjacent areas, or implementing modified control strategies that prioritize protection of critical regions.

Redundancy features built into the system architecture enhance reliability in emergency situations. These include redundant sensors, control processors, and in more complex configurations, overlapping coverage between adjacent GDUs to maintain protection even if individual units fail.

Failure management algorithms enable the control system to detect, diagnose, and respond to component failures or anomalies during operation. These algorithms implement appropriate compensatory actions based on the nature and severity of the failure, maintaining the best possible protection given the available resources and functional components.

The integration of the active gas-exuding heat shield system with the broader spacecraft systems and operations involves several important considerations to ensure optimal performance, reliability, and maintainability. The physical and functional interfaces between the active heat shield system and the spacecraft require careful design to ensure seamless operation while minimizing mass, volume, and complexity.

The mounting of system components to the spacecraft hull must address both structural and thermal considerations. GDUs are integrated directly into the outer surface of the spacecraft, with their external faces contoured to maintain the designed aerodynamic profile. The internal components, including the gas tank, MCV, DMs, and distribution piping, are mounted to the spacecraft primary structure with appropriate vibration isolation and thermal management provisions.

The piping layout is optimized to minimize length, mass, and pressure drop while ensuring accessibility for inspection and maintenance where required. The routing considers thermal expansion, vibration, and potential interference with other spacecraft systems during both normal operations and contingency scenarios.

The integration of the control system components, including the SCU, DCMs, and associated electronics, addresses EMI/EMC considerations, thermal management requirements, and access for potential in-flight reconfiguration or maintenance on long-duration missions.

Where appropriate, the active heat shield system shares resources with other spacecraft systems to reduce overall mass and complexity.

The working gas tanks may be shared with other systems that require similar gases, such as propellant tank pressurization systems or life support reserves on crewed vehicles. This sharing includes coordinated sizing, pressure regulation, and usage prioritization to ensure that all systems maintain adequate supplies throughout the mission.

The control system interface leverages existing spacecraft data buses and power distribution systems rather than implementing dedicated infrastructure. This integration includes standardized command and data protocols, power conditioning appropriate to the spacecraft electrical architecture, and coordinated fault detection and recovery procedures.

Monitoring systems, including temperature sensors and pressure transducers, may serve dual purposes, providing data to both the active heat shield control system and other spacecraft systems such as health monitoring, thermal management, or scientific instruments.

For reusable spacecraft, the maintenance and inspection of the active heat shield system between flights is critical to ensuring reliable performance over multiple missions. After each mission, the system undergoes a series of inspection and servicing procedures to prepare it for subsequent flights.

Component inspection focuses on the GDUs, which are exposed to the harsh entry environment, checking for erosion, clogging, or distortion that might affect their performance. This inspection may employ visual examination, flow testing, or advanced non-destructive evaluation techniques depending on the specific design and mission requirements. As experience with the system is gained, failure modes and problem areas will become apparent, allowing inspection, maintenance and repair processes to be optimized for faster turn-around time.

The gas system is refilled to the appropriate pressure with fresh working gas, accounting for any changes in mission profile or system performance observed during the previous entry. This refill operation includes verification of gas purity and leak testing to ensure system integrity.

Control system verification confirms the proper functioning of all electronic components, sensors, and software through a series of diagnostic tests and calibration procedures. Any anomalies observed during the previous mission are investigated and addressed through component replacement, software updates, or procedural modifications as appropriate.

Over the operational life of the spacecraft, the active heat shield system undergoes periodic more comprehensive maintenance to address cumulative effects and ensure continued reliable performance.

GDU inspection and cleaning addresses potential long-term issues such as internal deposits, material fatigue, or gradual erosion that might not be apparent in between-flight inspections. This maintenance may include removal and replacement of GDUs that show signs of degradation beyond acceptable limits.

System calibration maintains the accuracy of temperature sensors, pressure transducers, and flow control devices that might drift over time due to thermal cycling, radiation exposure, or other environmental factors. This calibration ensures that the control system continues to receive accurate data and implement precise adjustments throughout the operational life of the spacecraft.

Component replacement is scheduled based on predicted service life, observed degradation, or upgrades that enhance system performance or reliability. The modular design of the system facilitates such replacement with minimal impact on other spacecraft systems or overall mission timelines.

These comprehensive integration considerations ensure that the active gas-exuding heat shield system functions reliably as an integral part of the spacecraft, providing effective thermal protection throughout multiple atmospheric entries while minimizing impact on overall vehicle mass, complexity, and operational costs.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. An active thermal protection system for a spacecraft during atmospheric entry or reentry through a planetary atmosphere, comprising:

- a working gas containment tank configured to store a working gas; a master control valve (MCV) fluidly connected to the working gas containment tank;
- a distribution system fluidly connected to the MCV, the distribution system comprising:
  - a plurality of distribution manifolds (DMs), and
  - a gas dispenser unit (GDU) or a plurality of gas dispenser units (GDUs) each positioned on an exterior surface of the spacecraft and fluidly connected to the DMs, wherein each GDU comprises one or more discrete nozzle orifices configured to direct the working gas in controlled patterns;

a shield control unit (SCU) operatively connected to the DMs and configured to control gas flow to the GDUs across a plurality of surface zones of the spacecraft; and wherein each of the GDUs are configured to exude the working gas in an open-loop manner to create a protective gas envelope that insulates the spacecraft surface from direct contact with high-temperature atmospheric gases and deflects said gases away from the spacecraft surface during atmospheric entry or reentry, thereby preventing said high-temperature gases from reaching the spacecraft surface.

2. The system of claim 1, wherein the SCU is configured to:

monitor temperatures at or near each of the GDUs;

compare the monitored temperatures to predetermined threshold values; and adjust gas flow rates through the DMs to maintain the temperatures below the predetermined threshold values.

3. The system of claim 1, further comprising a flight control system (FCS) operatively connected to the SCU and configured to:

initiate activation of the thermal protection system prior to atmospheric entry;

receive status information from the SCU during operation; and command deactivation of the thermal protection system based on predetermined termination criteria.

4. The system of claim 3, wherein the predetermined termination criteria comprise at least one of an altitude parameter and temperature thresholds.

5. The system of claim 1, wherein the plurality of GDUs comprise:

normal flow GDUs configured to direct the working gas approximately perpendicular to the spacecraft surface; and parallel flow GDUs configured to direct the working gas approximately parallel to the spacecraft surface.

6. The system of claim 5, wherein: the normal flow GDUs are positioned at locations experiencing direct impingement of high-temperature atmospheric gases; and the parallel flow GDUs are positioned at locations where atmospheric flow is predominantly parallel to the spacecraft surface.

7. The system of claim 6, wherein: the normal flow GDUs comprise multiple nozzle orifices arranged to provide uniform coverage over a designated protection area; and the parallel flow GDUs comprise an elongated nozzle orifice designed to produce a fan-like gas dispersion pattern along the spacecraft surface.

8. The system of claim 1, wherein each GDU is contoured to match a local hull geometry at its installation location to maintain designed aerodynamic characteristics of the spacecraft.

9. The system of claim 1, wherein the working gas is helium.

10. The system of claim 1, wherein the distribution system further comprises: gas header piping connecting the MCV to the DMs; and distribution piping or sealed hull sections connecting the DMs to the GDUs.

11. The system of claim 1, further comprising a plurality of distributed control modules (DCMs), wherein:

each DCM is operatively connected to the SCU and to a subset of the DMs;

each DCM is configured to manage thermal protection for a specific zone of the spacecraft surface; and the SCU is configured to coordinate the operation of the plurality of DCMs to implement a coherent thermal protection strategy across the spacecraft.

12. A method of providing thermal protection to a spacecraft having an active thermal protection system as recited in claim 1, during atmospheric entry or reentry through a planetary atmosphere, comprising:

activating the master control valve to release a working gas from the gas containment tank into the distribution system;

monitoring temperature at a plurality of locations on an exterior surface of the spacecraft;

controlling, via the shield control unit, the flow of the working gas through the plurality of distribution manifolds to the plurality of gas dispenser units based on the monitored temperatures to prevent high-temperature atmospheric gases from contacting the spacecraft surface;

exuding the working gas through the gas dispenser units in an open-loop manner to create a protective gas envelope around portions of the spacecraft surface that insulates and deflects high-temperature atmospheric gases away from the spacecraft surface; and deactivating the flow of working gas when predetermined termination criteria are met.

13. The method of claim 12, further comprising:

verifying operational status of thermal protection system components prior to activating the master control valve;

reporting thermal protection system status to a flight control system; and implementing problem mitigation procedures if anomalies are detected in the thermal protection.

14. The method of claim 12, wherein controlling the flow of the working gas comprises:

dynamically adjusting gas flow rates to different regions of the spacecraft based on evolving thermal conditions to maintain the insulating gas envelope; and providing increased gas flow to areas experiencing more intense heating while providing reduced flow to areas with lower heating to conserve the working gas.

15. The method of claim 12, wherein the predetermined termination criteria comprise:

reaching a predetermined altitude at which aerodynamic heating no longer threatens spacecraft structural integrity; and all monitored points on the spacecraft surface are below respective safe threshold temperatures.

16. The method of claim 12, wherein deactivating the flow of working gas comprises:

closing the master control valve to stop the flow of gas from the gas containment tank; and reporting completed thermal protection system shutdown to a flight control system.

17. The active thermal protection system of claim 1, the single gas dispenser unit (GDU) or plurality of gas dispenser units (GDUs) each comprising:

a body constructed of metals or resins mountable on an exterior surface of the spacecraft;

internal gas flow channels configured to receive a working gas from a distribution system;

one or more nozzle orifices configured to exude the working gas in a predetermined pattern; and wherein the body is contoured to match local spacecraft hull geometry at an installation location.

18. The GDU of claim 17, wherein the body is manufactured using additive manufacturing techniques to create a monolithic structure with integrated gas flow channels.

19. The GDU of claim 17, wherein the one or more nozzle orifices are configured to direct the working gas approximately perpendicular to the spacecraft surface to create a strong local displacement of incoming hot atmospheric gases.

20. The GDU of claim 17, wherein the one or more nozzle orifices comprise an elongated orifice configured to direct the working gas approximately parallel to the spacecraft surface to create an insulating gas film between hot external flow and the spacecraft surface.

* * * * *